June 11, 1968   G. W. BAUGHMAN   3,388,250
TRAIN SPEED CONTROL SYSTEM
Filed Oct. 1, 1965   2 Sheets-Sheet 1

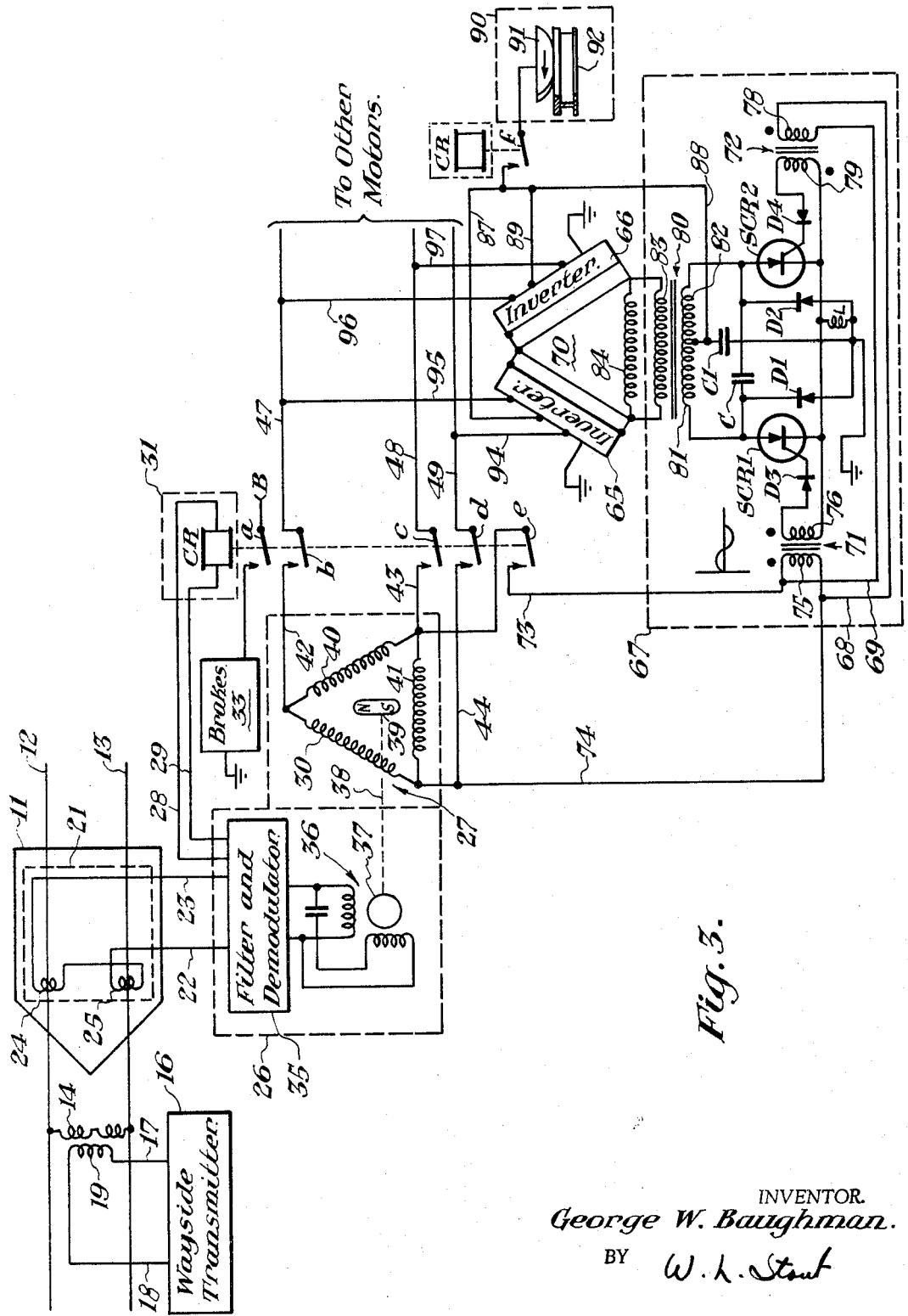

United States Patent Office 3,388,250
Patented June 11, 1968

3,388,250
TRAIN SPEED CONTROL SYSTEM
George W. Baughman, Swissvale, Pa., assignor to Westinghouse Air Brake Company, Swissvale, Pa., a corporation of Pennsylvania
Filed Oct. 1, 1965, Ser. No. 492,008
16 Claims. (Cl. 246—187)

ABSTRACT OF THE DISCLOSURE

This invention relates to a train speed control system in which the propulsion motor or motors are multiphase induction motors supplied with alternating current from a direct current power supply through the medium of switching devices, the rate of switching of which determines the frequency of the alternating current and hence the speed of the motor. The rate of switching is directly dependent on the frequency of a variable frequency speed control signal delivered to the train from the wayside.

---

This invention relates to a train speed control system in which the propulsion motor or motors are multiphase induction motors supplied with alternating current from a direct current power supply through the medium of switching devices, the rate of switching of which determines the frequency of the alternating current and hence the speed of the motor. The rate of switching is directly dependent on the frequency of a variable frequency speed control signal delivered to the train from the wayside.

The advent of high speed rapid transit has placed heavy demands on prior art train speed control systems. The continuing need to decrease the headway between trains traveling at high rates of speed has stretched to the limits of safety known techniques for fail-safe train speed control. Other prior art systems that attempt automatic train speed control rely primarily upon the incorporation of preselected programming techniques to attain automatic train speed control. The use of the invention to be described obviates the need for elaborate programming in the attainment of automatic train speed control.

Many prior art systems that required train-carried speed measuring devices were inherently susceptible to failures in the speed measuring devices which could result in full propulsion motor output even when the circumstances demand a more restrictive speed or even complete braking.

The invention to be described hereinafter completely avoids this possible situation by making the output from the propulsion motors directly and completely dependent upon a variable frequency signal from the wayside. The variable frequency signal is a positive measure of the maximum permissible speed for any given headway between trains or in the event of a broken rail or other malfunction and the propulsion motor speed would instantly be corrected to reflect the needed change in train speed operation.

In addition to obviating the prior art problems noted, the use of the invention to be described establishes a new and unique advance in the art which greatly enhances the attainment of efficient, fail-safe automatic train speed control.

It is, therefore, an object of this invention to provide automatic train speed control by the utilization of a direct current power supply for the propulsion motors, commutated at a variable frequency, which frequency is a measure of a maximum permissible speed.

Another object of this invention is to provide a wide range variable train speed control system that utilizes induction motors that have a fixed number of poles per phase and have a direct current power supply to the induction motors controlled by a solid state inverter at a rate dependent on the frequency received from the wayside.

Yet another object of this invention is to provide a fail-safe train speed control system that inherently operates in a speed restrictive manner in the event of a failure in any portion of the control system.

Another object of this invention is to provide a train speed control system that utilizes existing conventional induction propulsion motors without the alteration of the motors by the inclusion of a compact and inexpensive control mechanism that will allow the maximum variation in train speed control at a minimum cost.

Another object of this invention is the provision of an automatic train speed control system that completely obviates the need for complex programming to attain variable train speed control.

Another object of this invention is to provide a train speed control system that may be utilized in trains operating in electrified territory as well as train-carried power supplies such as Diesel electric driven train in non-electrified territory.

In the attainment of the foregoing objects there is utilized a train speed control system which includes the running rails upon which the train travels and a direct current power supply for the train's induction propulsion motor or motors. A wayside signal source of variable frequency energy forms an integral part of the system. This source of variable frequency energy provides a train speed control function. In the preferred embodiment the source of variable frequency energy includes a wayside transmitter and a transmission link to the train which includes the rails.

The remaining apparatus of the system is carried by the train and includes a frequency detector electrically coupled to the rails to detect the motor speed control signal of variable frequency being delivered from the wayside via the aforementioned transmission link. In addition, there is a frequency responsive unit which includes an induction motor, the induction motor's speed being controlled by the variable frequency speed control signal from the wayside received by the frequency detector and delivered to the induction motor. The speed of th frequency responsive unit's motor speed is a direct function of the frequency received by the frequency detector from the wayside.

The train propulsion motor that is to be controlled from the wayside is a multiphase induction motor with a fixed number of poles per phase. A solid state inverter connects the frequency responsive unit to the multiphase propulsion induction motor. The frequency responsive unit in addition to the induction motor also includes an alternator driven by this motor. The output from the alternator controls the inverter to connect the direct current power supply to each phase of the multiphase propulsion induction motor in a time sequence established by the frequency of the train speed control signal of variable frequency to thereby establish a smoothly variable propulsion speed control for the train's propulsion induction motor that is directly proportional to the frequency of the variable frequency energy source.

Other objects and advantages of the present invention will become apparent from the ensuing description of illustrative embodiments thereof, in the course of which reference is had to the accompanying drawings in which:

FIG. 3 is a circuit diagram illustrating the invention.

A description of the above embodiment will follow and then the novel features of the invention will be presented in the appended claims.

Figure 1:
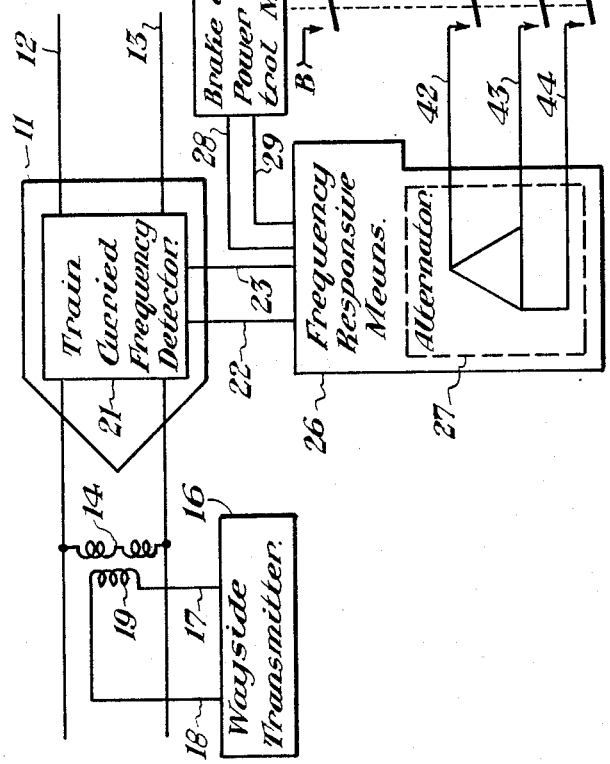
FIG. 1 illustrates in block diagram form the train speed control system embodying the invention.

Reference is now made to FIG. 1 in which there is illustrated in block diagram form an embodiment of the invention which will be discussed in greater detail hereafter. Referring now specifically to FIG. 1 where there is depicted a train 11 schematically represented as present on a pair of rails 12 and 13. To the left of the train across the rails 12 and 13 is an impedance bond 14 of the type described in a copending application for Letters Patent of the United States, Ser. No. 382,551, filed July 14, 1964, by Ralph Popp, for Electric Induction Apparatus. An integral portion of the impedance bond 14 is a primary coil 19 which is in turn electrically connected to a wayside transmitter 16 via the leads 17 and 18. The wayside transmitter 16 and the primary winding 19 of the impedance bond 14 function in a joint manner to impress upon the rails 12 and 13 a signal which is indicative of the maximum permissible speed the train 11 is permitted to travel. The wayside transmitter 16 transmits a carrier frequency that is modulated at a frequency dependent upon the traffic conditions in advance of the train 11. One way in which this wayside transmitter may be controlled to convey this modulation frequency is described in detail in the copending application for Letters Patent of the United States, Ser. No. 382,620, filed July 14, 1964, by Crawford E. Staples, for Rapid Transit Speed Control System. It will suffice to say for the description that will follow for this invention that the wayside transmitter 16 produces a variety of different modulated frequencies dependent upon the maximum permissible speed at which the train 11 may safely operate. These signals of variable frequency are coupled inductively via the primary coil 19 of the impedance bond 14 into the rails 12 and 13. While not illustrated in this figure, it should be recognized that the train 11 has a pair of steel wheels in contact with the rails 12 and 13, and these steel wheels form a complete circuit with the rails 12 and 13 in such a manner that the signal being transmitted by the wayside transmitter 16 travels through the primary winding 19, the impedance bond 14, and thence to the rail 12 through the wheels and axles of the train, which are not shown, back to the rail 13 and thence along the rail 13 to the impedance bond 14.

The frequency detector 21 depicted schematically in this drawing detects the presence of the variable frequency that appears in the rails 12 and 13. This frequency detector in turn is electrically connected via leads 22 and 23 to the frequency responsive means 26. This frequency responsive means 26 has as integral part thereof an alternator 27. The precise manner of the connection of the alternator 27 with the frequency responsive means 26 will be set forth in detail with reference to FIG. 3. It suffices to say at this time that the frequency detector 21, upon the detection of the variable frequency signal in the rails 12 and 13, transmits via the leads 22 and 23 the signal to the frequency responsive means 26 which in turn drives the alternator 27 at a rate directly proportional to the variable frequency received by the frequency detector 21. At this point it should be recognized that the system provides a fail-safe feature in that a signal will appear in the leads 28, 29 from the frequency responsive means 26 only when a control signal from the wayside transmitter is detected and delivered to the frequency responsive means 26. The leads 28 and 29 in turn control or feed energy to the brake and power control means 31. It should be immediately evident that in the event that no signal is present in the rails 12 and 13 in the event of a broken rail, or in the alternative should the most restrictive condition appear in the traffic pattern in which the train 11 is operating, no signal would be transmitted from the wayside transmitter 16 and therefore no speed control signal would appear in the electrical leads 22 and 23 or frequency responsive means 26. Therefore, the leads 28 and 29 from the frequency responsive means 26 will only be energized when there is a speed control signal present on the rails. This signal, in turn, will permit the energization of the brake and power control means 31 which in turn will close the brake switch 32 which will in turn release the brakes 33. Simultaneously, upon the energization of the brake and power control means 31 the alternator output control switch 34 with its related contacts will be closed, thereby permitting the passage of the alternator current and voltage from the alternator 27 via the leads 42, 43 and 44 to the leads 47, 48 and 49 over the alternator output control switch 34 and the contacts just noted. It can therefore be seen that in the event of any interruption in the delivery of a variable frequency from the wayside transmitter 16, the brake and power control means 31 will immediately be deenergized, thereby opening the contacts to the brakes and the alternator output control switch 34, thereby rendering the system inoperative. Since the brakes 33 will be actuated only when there is no current to the brakes 33, the brakes will immediately be applied and the train be brought to a halt.

Referring now again to the frequency responsive means 26 and its related alternator 27, the alternator 27 will be driven at a speed which is directly proportional to the variable frequency received by the frequency detector 21 and transmitted to the frequency responsive means 26. Accordingly, the output from the alternator on the leads 42, 43 and 44, which pass over the contacts of the alternator control switch 34 to the electrical leads 47, 48 and 49, will be a signal which is directly proportional to the variable frequency transmitted from the wayside by the wayside transmitter 16. Directly connected across the leads 47, 48 and 49 are a series of inverter circuits schematically shown as 65, 66 and 67. The induction propulsion motor 70 is shown schematically to the right in the drawing in accordance with the general designation set forth in the Standard Handbook for Electrical Engineers on page 706 thereof. The inverter 66 is connected across the leads 57 and 59 and is connected to the leads 48 and 47 by the electrical leads 52 and 53. In a similar manner the inverter 65 is connected across the leads 57 and 58 by the electrical leads 55 and 54. Finally, the inverter 67 is connected across the leads 58 and 59 via the electrical leads 60 and 61.

From this illustration it is evident that for each of the phases of this three-phase induction motor 70 there has been an inverter connected across a phase of each of the three phases fed by the leads 47, 48 and 49, which leads are fed signals from the alternator 27. Therefore, the inverter circuits which will be described more fully with respect to FIG. 3 provide the important function of converting the power delivered by the direct current power supply 90 into an alternating current for the propulsion induction motor 70. In this particular embodiment the propulsion induction motor 70 is powered by the direct current power supply 90, the direct current power supply 90 is fed to each of the inverters via the front contact f of the relay CR and thence over the parallel leads 87, 88 and 89 to the inverters 65, 67 and 66, respectively. These inverters and the related connections to the alternator 27 provide a sequential application of a direct current power supply to each phase of the induction motor 70 in a timed sequence that is directly proportional to the frequency delivered from the wayside transmitter 16. The precise manner in which the direct current power supply and the inverters 65 and 66 function to produce this timed sequence application of direct current power to the propulsion motor 70 will be explained in more detail with reference to FIG. 3.

It suffices to say that the inverters 65, 66 and 67 perform the important function of converting direct current power to alternating current power as needed to drive the induction propulsion motor 70 at a rate that is dependent upon the variable frequency transmitted from the wayside. Therefore, the induction propulsion motor 70 will be driven at a speed which is proportionate to and directly related to the traffic conditions and safety requirements of the system. The induction propulsion motor 70 will accordingly operate at a speed which will be smoothly variable over the range determined by the variable frequency transmitted from the wayside transmitter 16. It has been indicated taht the direct current power supply 90 is connected over the front contact $f$ of the control relay CR. The control relay CR and its related function with the brake and power control means 31 will be set forth in more detail with reference to FIG. 3. At this point, all that needs to be said is that the brake and power control means will cause the relay CR to be in a picked-up condition whenever an appropriate signal appears in the frequency responsive means 26 from the frequency detector 21. This schematic representation of FIG. 1 is meant to broadly set forth the invention, and when FIG. 1 is studied in conjunction with FIG. 2, it will be readily apparent that a variety of continuously variable speeds are obtainable dependent upon the frequency delivered from the wayside and the number of poles per phase present in the induction propulsion motor 70.

Figure 2:
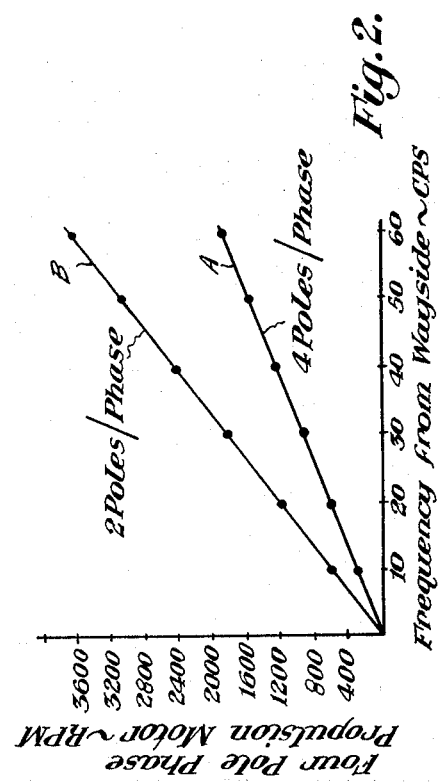
FIG. 2 is a graph of propulsion motor r.p.m. versus train speed control frequency in cycles per second from the wayside.

Reference is now made specifically to FIG. 2, in which there is illustrated a curve which is representative of the propulsion motor r.p.m. versus the frequency from the wayside, which frequency is measured in cycles per second. In the event that the induction propulsion motor 70 is a four-pole per phase induction motor, then the output speed of the propulsion motor will be represented by the curve designated A. Should the requirements of this system demand a higher output speed from the induction motor, this may be attained by the use of a two-pole per phase induction motor which would then give a maximum propulsion motor r.p.m. of 3600 at 60 cycles per second. This curve is shown as curve B in FIG. 2.

The speed control present in this system is therefore directly dependent upon the following equation:

the r.p.m. of the propulsion induction motor $= f \times \dfrac{120}{P}$ where $P$ = the poles per phase of the induction motor,
$f$ = the frequency in cycles per second from the wayside.

From the above equation it can be seen when a study is made of FIG. 2, that where the poles per phase are kept constant, for example, at either four poles per phase or two poles per phase, and the frequency from the wayside is the controlling factor, the frequency from the wayside determines the output r.p.m. of the induction propulsion motor. Since this system provides for a directly proportional commutation of the inverters 65, 66 and 67 at a frequency which is dependent upon the signal delivered from the wayside, a system results in which there is provided a smoothly variable speed control of the train's propulsion induction motor 70 totally dependent upon the presence of a wayside signal delivered by the transmitter 16.

Reference is now made to FIG. 3 in which there is set forth an embodiment of the invention shown with the essential circuit detail. Wherever reference numerals may be directed to designate elements already shown in FIG. 1, these reference numerals will be utilized again. Accordingly, the train 11, which travels along the rails 12 and 13, has carried thereon a frequency detector 21. This frequency detector 21 is comprised of a pair of coils 24 and 25 connected in series to inductively pick up from the rails 12 and 13 the variable frequency signal which has been delivered via the impedance bond 14 and its primary winding 19, and the wayside transmitter 16, discussed with reference to FIG. 1. The variable frequency received by the detector coils 24 and 25 is fed via the electrical leads 22 and 23 to the frequency responsive unit 26, designated in dashed lines in this figure. This frequency responsive unit 26 contains a filter and demodulator 35 which in turn is connected to and drives a split phase induction motor 36 as well as the brake and power control means 31 via the leads 28, 29. The rotor 37 of the split phase induction motor 36 accordingly is driven at a speed that is dependent upon the frequency delivered to the frequency responsive device 26. The rotor 37 of the split phase induction motor 36 has connected thereto a mechanical link 38 shown by dashed lines in this figure. The mechanical link 38 drives a two-pole permanent magnet alternator 39, which alternator 39 cooperates with the windings 30, 40 and 41 of the alternator 27. It will therefore be seen that the frequency of the signal generated by the alternator 27 will be directly proportional to the rotational speed of the rotor 37 of the split phase induction motor 36, and since the rotational speed of the rotor 37 of the split phase induction motor 36 is directly proportional to the frequency received by the frequency detector coils 24 and 25 from the wayside transmitter 16, the output signals from the alternator 27 will bear a direct relationship to the signals generated by the wayside transmitter 16. Accordingly, there will appear an alternating current signal output from the alternator 27, which signal bears the same frequency as that being delivered by the wayside transmitter 16.

The output from the alternator 27 will therefore appear on the leads 42, 43 and 74, which lead from the alternator 27. These leads 42, 43 and 74 will control the triggering of the inverters 65, 66 and 67 which are integrally connected to the induction motor 70 in a manner yet to be described.

The brake and power control means 31 is comprised of a control relay CR and this control relay, when energized by the presence of a signal in the leads 28 and 29, causes the front contacts $a$, $b$, $c$, $d$, $e$ and $f$ of the relay CR to close. In closing these contacts just noted, the control relay causes in the first instance the brakes 33 to be released in a known manner when the contact $a$ of relay CR provides a completed circuit over the front contact $a$ of relay CR, thence to the brake unit 33. The power is supplied to the brake 33 from the battery connection B over the front contact $a$ of control relay CR and thence to a ground connected to the brake system. The contacts $b$, $c$, $d$ and $e$ of control relay CR provide the essential function of providing a means to pass the commutating signal that emanates from the alternator 27 to the inverters 65, 66 and 67, noted earlier. The control relay CR also provides an additional control function in that the control relay CR, shown dotted to the right in FIG. 3, closes the front contact $f$ of the control relay CR when the relay CR is energized, thereby permitting the passage of the direct current from the power supply 90 via the rail 92 and contact shoe 91, thence over the front contact $f$ of the control relay CR to the parallel electrical power leads 87, 89 and 88 which are fed respectively to the inverters 65, 66 and 67 and provide the power to drive the induction propulsion motor 70. Therefore, should there be any failure in the rails or signaling system, no signal would appear in the leads 22 and 23 which would result in a deenergization of the control relay CR, opening the front contact $f$ of the control relay CR, thereby breaking the direct current power supply 90 from electrical connection with the respective inverters 65, 66 and 67. This feature provides the requisite answer to the fail-safe requirements presently required of all modern transit systems.

Since only one inverter of the inverters 65, 66 and 67 need be shown in detail to present an understanding of the operation of the system, inverter 67 has been shown in an amplified manner in the lower portion of FIG. 3. It is to be understood that the inverters 65 and 66 are of a similar type as that described with reference to the one shown in detail at the bottom of FIG. 3 and designated inverter 67. This inverter is of the same general type as the inverter shown in the SCR Manual, Second Edition, of the General Electric Company, on page 152 thereof. The only addition to the inverter described in great detail in the General Electric Company manual resides in the inclusion of diodes D3 and D4 which provide the additional function of insuring the appearance of a positive pulse to trigger the silicon controlled rectifiers SCR1 and SCR2, respectively.

In general operation the inverter 67 works as follows: The two-pole alternator 39 by its rotational movement induces in the winding 41 of the alternator 27 and alternating current with a frequency which is proportional to the wayside transmitter frequency. This current is delivered via the electrical lead 74 through the primary coil 75 of the transformer 71, the lead 73, and the front contact $e$ of the control relay CR, to the right-hand end of the winding 41 of the alternator 27. This completed circuit of the primary winding 75 will permit an alternating potential on the secondary coil 76, thereby assuring the appearance of a positive pulse to pass through the diode D3 to trigger the silicon controlled rectifier SCR1. In a similar manner the next half cycle delivered by the alternator via the electrical lead 74 appears across the leads 74 and 73, this signal being transferred via the electrical lead 68 through the primary winding 78 of the transformer 72, and back along the lead 69 to the electrical lead 73. This half cycle on the primary 78 of transformer 72 causes a positive pulse to pass through the diode D4 to trigger the silicon controlled rectifier SCR2.

Now in accordance with the General Electric Company manual noted above, the operation of this inverter will be described. As has been noted, a trigger signal which is represented by the alternating current delivered by the alternator 27 will apply positive polarity signals alternatively to the gates of SCR1 and SCR2 via the diodes D3 and D4 already noted. Assume now that SCR1 is conducting and SCR2 is blocking. This will occur when the positive portion of the signal is delivered via the transformer 71 to the trigger electrode of the silicon controlled rectifier SCR1. The current from the direct current power supply 90 will then be delivered over the electrical lead 88 to the autotransformer 80 of the inverter 67. A current will then flow from the direct current power supply 90 over the front contact $f$ of the control relay CR and through the electrical lead 88, thence through the left-hand side 81 of the autotransformer 80. Autotransformer action will produce a voltage of approximately twice the voltage delivered from the direct current power supply 90 at the anode of the silicon controlled rectifier SCR2 and across the capacitor C. When the next trigger pulse which is applied to the gate of the silicon controlled rectifier SCR2 appears, this pulse will turn on SCR2 and the top end of the inductor L will rise momentarily to about twice the voltage delivered by the direct current power supply 90, which reverse biases the silicon controlled rectifier SCR1 and causes it to turn off. The capacitor C and the inductor L will maintain a reverse bias across SCR1 long enough for SCR1 to recover to a blocking state. The next triggering pulse will occur at the gate of SCR1 and will cause the circuit to revert to its original state. In this manner the current from the direct current power supply 90 will flow through the electrical lead 88 and then flow alternately through the left-hand side 81 of the transformer 80 and then the right-hand side 82 of the transformer 80 to provide an alternating current voltage across the secondary winding 83 of the autotransformer 80 which will therefore produce in the winding 84 of the induction motor 70 an alternating current signal of sufficient power and of a frequency determined by the alternator output from alternator 27. This commutation of the direct current power supply 90 will cause the induction motor 70 to be driven at a speed which bears a direct relationship as noted with reference specifically to FIG. 2, where the frequency delivered from the wayside is graphically represented as controlling the final output speed of the propulsion induction motor.

One advantage in utilizing an inverter 67 of the type described in the General Electric Company manual resides in the ability of this circuit to operate under lightly loaded or open circuit conditions.

The feedback diodes D1 and D2 prevent the voltage across either half of the primary winding 81, 82 from exceeding the supply voltage which is delivered by the direct current power supply 90. These diodes D1 and D2 not only maintain a square wave output under all load conditions but also permit the use of lower break-over voltage and therefore less expensive silicon controlled rectifiers.

The capacitor C1 position in the circuit at a point adjacent the power supply lead 88 is required so that the inverter circuit may accept power as well as supply power.

The series inductance L should be quite small and chosen to resonate with capacitor C to create a short impulse to turn off the conducting silicon controlled rectifier. The inductance L also serves as a ballast to prevent excessive current flow during switching. During the switching interval opposing currents flow in their paths of the transformer primaries 81 and 82 to the commutating capacitor C and to the anode of the silicon controlled rectifier which has been turned on, respectively, SCR1 and then SCR2. These opposing primary currents decrease the power delivered to the load. This switching interval is decreased by using specially selected silicon controlled rectifiers. The values of C and L for the capacitor and the inductance are determined by the maximum current to be commutated. Each of these factors is a matter of design and may be readily selected upon a cursory study of the General Electric manual cited above.

The discharge of capacitor C through the inductance L is oscillatory. When the anode of the silicon controlled rectifier SCR2 goes below ground, for instance, diode D2 conducts. This conduction occurs at the end of the commutating interval of silicon controlled rectifier SCR1 and causes the remaining commutating energy stored now to be dissipated in the forward direction of diode D2, silicon controlled rectifier SCR2, and the winding resistance of the inductance L. With an inductive load the operation of the inverter is more complex. Assuming that the silicon controlled rectifier SCR1 is conducting, turning on SCR2 will turn SCR1 on as described previously. An inductive load, however, prevents the main load current from reversing instantaneously so transformer load current must flow through D2 back into the direct current power supply until the load current reverses. During this feedback interval the current through SCR2 will fall to zero and SCR2 will actually become back biased so that it will have to be triggered again when the load current reverses. After being retriggered the silicon controlled rectifier SCR2 will continue conduction for the rest of the half cycle. The silicon controlled rectifier SCR2 can be retriggered either by applying another pulse at the proper time or in the alternative by maintaining a gate drive for a full half cycle if the load has a varying power factor.

While the above is not an extensive and detailed analysis of the inverter as is possible, it is believed that a study of the General Electric manual will provide those skilled in the art any additional information needed to put into practice this aspect of the invention as set forth in the embodiment in FIG. 3.

As has been noted, there will be induced in the windings 30 and 40, as well as the winding 41, of the alternator 27, signals which will have a frequency which is directly proportional to the wayside transmitter frequency. These signals will appear over the electrical leads 42, 43 and 74. The inverter 65 receives its controlling signal via the electrical lead 44 over the back contact d of control relay CR, thence over electrical lead 49 and electrical lead 94 to one side of the inverter 65. The other connection to the inverter is made via the electrical lead 42 over the front contact b of control relay CR, thence over the electrical leads 47 and 95 to the other side of the inverter 65. The direct current power supply is delivered to this inverter via the rail 92, the contact element 91, over the front contact f of the control relay CR, and thence over the electrical lead 87 to the inverter 65 where it is connected in a manner similar to that described with reference to the inverter 67.

In a like manner a signal of alternating voltage and current is delivered to the inverter 66 over the lead 42, thence over the front contact b of the control relay CR, over the electrical lead 47, and the electrical lead 96 to one side of the inverter 66. In a similar manner the other side of the inverter 66 is connected electrically via the lead 97, the electrical lead 48, over the front contact c of the control relay CR, then through the electrical lead 43 to the ends of the alternator windings 40 and 41. It will therefore be seen that each of the inverters is connected appropriately across the outputs of the alternator and each is driven in a timed sequence dependent upon the frequency from the wayside transmitter to provide the needed signal to drive the propulsion induction motor 70 at a speed which is directly proportional to the signal from the wayside. All of these unique functions are accomplished through the use of solid state devices which provide for an economical and heretofore unattainable power speed control for a train propulsion system which provides inherently a fail-safe system.

While not illustrated herein it should be understood that the invention contemplates as within its scope the provision of a conventional switch which would allow the propulsion power circuits to continue intact even though no frequency control was received from the track. This would be for the purpose of insuring a smooth and prompt stop by the braking effect of the propulsion motors when they are being forced to operate at a speed in excess of synchronism.

While the present invention has been illustrated and disclosed in connection with the details of the illustrative embodiment thereof, it should be understood that those are not intended to be limitative of the invention as set forth in the accompanying claims.

Having thus described my invention, what I claim is:

1. A train propulsion motor speed control system having a direct current power supply for said propulsion motor comprising,
   (a) a source of variable frequency energy signal to control the speed of said train,
   (b) a train-carried frequency detector means to detect said signal of variable frequency energy,
   (c) a multiphase propulsion induction motor,
   (d) a frequency responsive means electrically connected to and controlled by said train-carried frequency detector means,
   (e) an inverter means electrically connected to said frequency responsive means and said multiphase propulsion induction motor,
       said frequency responsive means including an induction motor, said induction motor's speed being controlled by the frequency received by said frequency detector means and delivered to said induction motor,
       said induction motor drivingly coupled to an alternator means,
       said alternator means having an output which controls said inverter means,
       said inverter means being controlled by said frequency responsive means to connect said direct current power supply to each phase of said multiphase propulsion induction motor in a timed sequence established by said variable frequency source to thereby establish a propulsion speed control for said train's propulsion motor.

2. The train propulsion motor speed control system of claim 1 wherein said train-carried frequency detector means is a pair of coils mounted on said train.

3. The train propulsion motor speed control system of claim 1 wherein said source of variable frequency energy includes a wayside variable frequency transmitter electrically coupled to the rails upon which said train travels and a transmission link to said train which includes said rails.

4. The train propulsion motor speed control system of claim 1 in which said direct current power is supplied from the wayside when said train is operated in electrified territory and said multiphase propulsion motor has a fixed predetermined number of poles per phase.

5. The train propulsion motor speed control system of claim 1 in which said direct current power is supplied from a combustion engine driven direct current generator and said multiphase propulsion motor has a fixed number of poles per phase.

6. A train propulsion motor speed control system having a direct current power supply to said propulsion motor comprising in combination,
   (a) a signal source of variable frequency energy to control the train's propulsion motor speed,
   (b) a train-carried frequency detector means detecting said signal of variable frequency,
   (c) a multiphase propulsion induction motor,
   (d) a frequency responsive means electrically connected to and controlled by said frequency detector means,
       said frequency responsive means having an output proportional to said variable frequency received by said train-carried frequency detector means,
   (e) an inverter means electrically connected to said frequency responsive means and said multiphase propulsion induction motor,
       said frequency responsive means including an induction motor, said induction motor's speed being controlled by the frequency received by said frequency detector and delivered to said induction motor,
       said induction motor drivingly coupled to an alternator means,
       said alternator means having an output which controls said inverter means to vary the rate and time sequence of said direct current power supply to said multiphase propulsion induction motor,
       said inverter means being controlled by said proportional output from said frequency responsive means to connect said direct current power supply to each phase of said multiphase propulsion induction motor in a timed sequence established by said frequency of said variable frequency energy source to thereby establish a smoothly variable propulsion speed control for said train's propulsion motor that is directly proportional to said frequency of said variable frequency energy source.

7. The train propulsion motor speed control system of claim 6 wherein said train-carried frequency detector means is a pair of coils mounted on said train.

8. The train propulsion motor speed control system of claim 6 wherein said source of variable frequency energy includes a wayside variable frequency transmitter electrically coupled to the rails upon which said train travels and a transmission link to said train which includes said rails.

9. The train propulsion motor speed control system of claim 6 wherein said inverter means includes an individual inverter for each phase of said multiphase propulsion induction motor, each of said individual inverters having first, second and third inputs, and a single output, said first and said second inputs electrically connected to said alternator means, and said third input electrically connected to said direct current power supply, each of said single inverter outputs electrically coupled to an individual phase of said multiphase induction motor.

10. The train propulsion motor speed control system of claim 6 in which said direct current power is supplied from the wayside when said train is operated in electrified territory and said multiphase propulsion motor has a fixed predetermined number of poles per phase.

11. The train propulsion motor speed control system of claim 6 in which said direct current power supply is derived from a train-carried source and said multiphase propulsion motor has a fixed number of poles per phase.

12. A train propulsion motor speed control system having a direct current power supply to said propulsion motor comprising,
  (a) a signal source of variable frequency energy to control the train's propulsion motor speed,
      said source of variable frequency including a wayside variable frequency transmitter electrically coupled to the rails upon which said train travels and a transmission link to said train which includes said rails,
  (b) a train-carried frequency detector means electrically coupled to said rails to detect said signal of variable frequency,
  (c) a frequency responsive means electrically connected to and controlled by said frequency detector means,
  (d) a multiphase propulsion indication motor,
  (e) an inverter means electrically connected to said frequency responsive means and said multiphase propulsion induction motor,
  (f) said frequency responsive means including an induction motor, said induction motor's speed being controlled by the frequency received by said frequency detector and delivered to said induction motor,
      said induction motor drivingly connected to an alternator means,
      said alternator means having an output which controls said inverter means to connect said direct current power supply to each phase of said multiphase propulsion induction motor in a timed sequence established by said frequency of said variable energy source to thereby establish a smoothly variable propulsion speed control for said train's propulsion motor that is directly proportional to said frequency of said variable frequency energy source.

13. The train propulsion motor speed control system of claim 12 wherein said inverter means includes an individual inverter for each phase of said multiphase propulsion induction motor, each of said individual inverters having first, second and third inputs, and a single output, said first and said second inputs electrically connected to said alternator means, and said third input electrically connected to said direct current power supply, each of said single inverter outputs electrically coupled to an individual phase of said multiphase induction motor.

14. The train propulsion motor speed control system of claim 12 in which said direct current power is supplied from the wayside when said train is operated in electrified territory and said multiphase propulsion motor has a fixed predetermined number of poles per phase.

15. The train propulsion motor speed control system of claim 12 in which said direct current power supply is derived from a train-carried power source and said multiphase propulsion motor has a fixed number of poles per phase.

16. Train propulsion motor speed control system having a direct current power supply for said propulsion motor comprising,
  (a) a train-carried frequency detector means to detect said signal of variable frequency,
  (b) a source of variable frequency energy to control the speed of said train,
  (c) a frequency responsive means electrically connected to and controlled by said train-carried frequency detector means,
  (d) a multiphase propulsion induction motor,
  (e) an inverter means electrically connected to said frequency responsive means and said multiphase propulsion induction motor,
      said inverter means including an individual inverter for each phase of said multiphase propulsion induction motor,
      each of said individual inverters having first, second and third inputs, and a single output,
      said first and said second inputs electrically connected to said frequency responsive means, and said third input electrically connected to said direct current power supply,
      each of said single inverter outputs electrically coupled to an individual phase of said multiphase induction motor,
      said inverter means being controlled by said frequency responsive means to connect said direct current power supply to each phase of said multiphase propulsion induction motor in a timed sequence established by said variable frequency source to thereby establish a propulsion speed control for said train's propulsion motor.

References Cited

UNITED STATES PATENTS

| | | | |
|---|---|---|---|
| 2,685,055 | 7/1954 | Winther | 318—231 |
| 2,784,365 | 3/1957 | Fenemore et al. | 318—231 X |
| 3,159,779 | 12/1964 | Fredrickson | 318—231 X |
| 3,164,760 | 1/1965 | King | 318—231 X |
| 3,227,936 | 1/1966 | Crokrell | 318—230 X |
| 3,262,036 | 7/1966 | Clarke et al. | 318—231 X |
| 3,270,199 | 8/1966 | Smith | 246—187 X |
| 3,289,062 | 11/1966 | Dannettell | 318—231 X |

ARTHUR L. LA POINT, *Primary Examiner.*

STANLEY T. KRAWCZEWICZ, *Examiner.*